US008903876B2

United States Patent
Michael et al.

(10) Patent No.: US 8,903,876 B2
(45) Date of Patent: Dec. 2, 2014

(54) FILE STORAGE SYSTEM BASED ON COORDINATED EXHAUSTIBLE AND NON-EXHAUSTIBLE STORAGE

(75) Inventors: Amir Meir Michael, San Mateo, CA (US); Song Liu, Fremont, CA (US); Jason Matthew Taylor, Berkeley, CA (US); Yael Maguire, Boston, MA (US); Per Brashers, Oakland, CA (US); Eitan Frachtenberg, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 192 days.

(21) Appl. No.: 13/585,967

(22) Filed: Aug. 15, 2012

(65) Prior Publication Data

US 2014/0052764 A1 Feb. 20, 2014

(51) Int. Cl.
*G06F 17/30* (2006.01)

(52) U.S. Cl.
USPC .......................................... 707/824

(58) Field of Classification Search
USPC .......................................... 707/824
See application file for complete search history.

(56) References Cited

U.S. PATENT DOCUMENTS

| | | | |
|---|---|---|---|
| 5,970,495 A | 10/1999 | Baru et al. | |
| 7,650,480 B2 * | 1/2010 | Jiang | 711/165 |
| 8,112,395 B2 | 2/2012 | Patel et al. | |
| 8,447,946 B2 * | 5/2013 | Nakatogawa | 711/165 |
| 2004/0243761 A1 * | 12/2004 | Bohrer et al. | 711/114 |
| 2006/0053262 A1 * | 3/2006 | Prahlad et al. | 711/162 |
| 2007/0088703 A1 | 4/2007 | Kasiolas et al. | |
| 2008/0005475 A1 | 1/2008 | Lubbers et al. | |
| 2010/0153621 A1 * | 6/2010 | Kreiner et al. | 711/103 |
| 2010/0174852 A1 * | 7/2010 | Chien et al. | 711/103 |
| 2010/0274982 A1 | 10/2010 | Mehr et al. | |
| 2011/0106863 A1 * | 5/2011 | Mamidi et al. | 707/823 |
| 2011/0258363 A1 * | 10/2011 | Doatmas et al. | 711/103 |
| 2012/0117297 A1 | 5/2012 | Ish | |
| 2012/0131413 A1 * | 5/2012 | Thatcher et al. | 714/758 |
| 2012/0215970 A1 * | 8/2012 | Shats | 711/103 |

* cited by examiner

*Primary Examiner* — James E Richardson
(74) *Attorney, Agent, or Firm* — Fenwick & West LLP

(57) ABSTRACT

A file storage system is implemented by coordinating non-exhaustible and exhaustible storage devices. The exhaustible storage devices include lower grade flash based storage devices. The non-exhaustible storage devices are based on magnetic recording mechanisms or higher grade flash storage. The file storage system stores received content items on the exhaustible storage devices, and stores metadata for the content items and/or the file storage system on the non-exhaustible storage devices. During operation, the file storage system globally optimizes the content items on the exhaustible storage devices such that more heavily accessed items are moved to exhaustible storage devices that have experienced relatively few data operations. The file storage system moves less frequently accessed content items to exhaustible storage devices that have experienced a relatively large number of data operations. As such, the operation lifetime of the exhaustible storage devices as a whole can be prolonged.

21 Claims, 6 Drawing Sheets

FILE STORAGE SYSTEM BASED ON COORDINATED EXHAUSTIBLE AND NON-EXHAUSTIBLE STORAGE

BACKGROUND

This invention generally pertains to file storage, and more specifically to the coordinated use of exhaustible and non-exhaustible storage in a file storage system.

In recent years, many different online applications have been developed for use by a large number of distributed users. Illustratively, many online applications provide services ranging from gaming to social networking to thousands or millions of users over the Internet. Because such applications have large user bases, many require the storage and retrieval of significant amounts of data. For example, an online photo storage application may require the storage and retrieval of many terabytes or petabytes of images files.

One problem with current online applications is that as the amount of data stored by each application grows, the operating costs for the applications accordingly increases. For example, as online photo storage applications receive more image files from its users, the number of relatively expensive hard drives required by the applications dramatically increases. As a result, operating costs for such online photo storage applications can become quite substantial over time. While cheaper storage device alternatives (e.g., certain types of lower grade flash based storage devices) are currently available, such devices have not been adopted by online applications as the devices only afford a very limited number of lifetime data operations (e.g., read and/or write operations).

SUMMARY

Embodiments of the invention provide a file storage system based on coordinated exhaustible and non-exhaustible storage devices. As used herein, an exhaustible storage device may refer to any suitable type of storage device with a theoretical lifetime number of data operations (e.g., write operations) that is less than the theoretical lifetime number of data operations for a non-exhaustible storage device. In one embodiment, an exhaustible storage device may be a lower grade flash storage device (e.g., flash storage devices similar to storage devices used in digital cameras, USB thumb drives, or certain limited storage devices based on TLC technology). Such storage devices may be of lower grade because the devices have very limited numbers of theoretical lifetime data operations and/or limited performance levels. As used herein, a non-exhaustible storage device may be a hard drive based on a magnetic recording mechanism and/or a hard drive based on higher grade flash storage (e.g., certain solid state hard drives based on SLC technology). Such non-exhaustible storage devices may have much greater numbers of theoretical lifetime data operations and/or relatively better performance levels as compared to the exhaustible storage devices.

In one embodiment, the file storage system may store content items (e.g., image files, media files, etc.) in an exhaustible storage that is comprised of one or more exhaustible storage devices. For example, the file storage system may store a received image file in one of a number of lower grade flash drives comprising the exhaustible storage. The file storage system may additionally store associated metadata, error correction information and/or other more frequently updated data on a non-exhaustible storage of the system. The non-exhaustible storage may comprise of one or more non-exhaustible storage devices. For example, the non-exhaustible storage may include a number of magnetic based hard drives and/or higher grade flash based storage devices. In one embodiment, because content items are larger in size than their associated metadata and error correction information, the storage capacity of the exhaustible storage may exceed the storage capacity of the non-exhaustible storage.

In one embodiment, the file storage system may globally optimize the content items stored in the exhaustible storage over time. More specifically, the file storage system may periodically shift or move the content items in the exhaustible storage based on access patterns for the content items and/or the storage devices. In an embodiment, the file storage system may move content items that are heavily accessed (e.g., written to and/or read from) to exhaustible storage devices that have experienced relatively few data operations. Likewise, the file storage system may move content items that have been accessed relatively infrequently to exhaustible storage devices that have experienced a relatively large amount of data operations. In this way, the operational lifetime of the exhaustible storage devices as a whole can be extended as storing less frequently accessed content items on more heavily used exhaustible storage devices can slow the rate at which the heavily used storage devices are expended.

By using both exhaustible and non-exhaustible storage in the manner described, embodiments enable reliable and cost effective data storage. In particular, embodiments allow operating expenditures to be minimized by employing low cost and energy/power efficient exhaustible storage devices to handle the bulk of data storage rather than more expensive non-exhaustible storage options. Furthermore, by employing a limited amount of non-exhaustible storage devices to store frequently updated data (e.g., metadata and error correction information), the number of data operations performed on the exhaustible storage devices can be minimized. Moreover, by globally optimizing the exhaustible storage devices based on their access patterns, the operational lifetime of the exhaustible storage devices can be extended. As a result, the need to replace expended exhaustible storage devices can be reduced. Furthermore, through shifting content items across multiple exhaustible storage devices, embodiments enable data to be preserved at a rate similar to file storage systems based primarily on non-exhaustible storage. As such, the traditional problems of utilizing exhaustible storage as primary storage can be alleviated.

The features and advantages described in this summary and the following detailed description are not all-inclusive. Many additional features and advantages will be apparent to one of ordinary skill in the art in view of the drawings, specification, and claims hereof.

Figure 1:
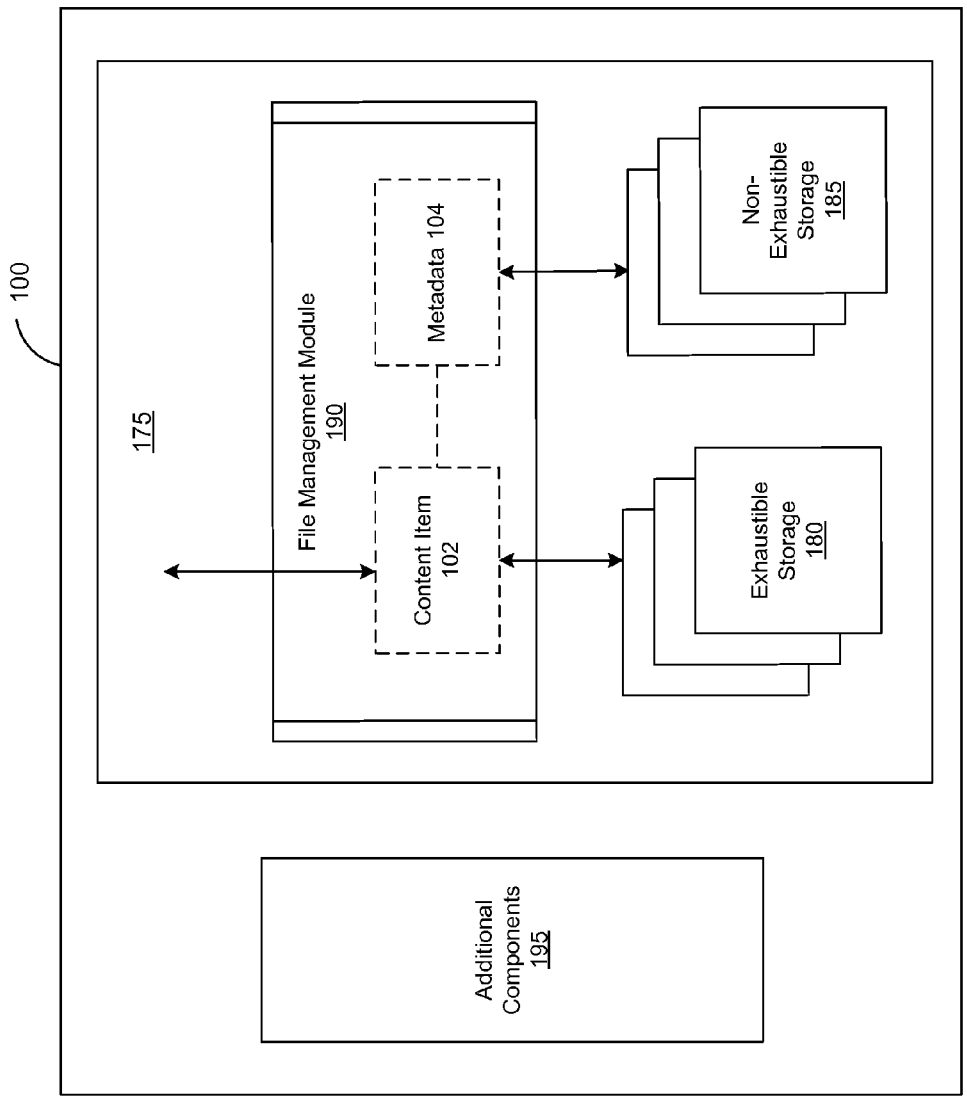
FIG. 1 is a diagram of a file storage system, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein. For example, while the discussion is primarily directed at social networking systems, one skilled in the art will readily recognize that alternative embodiments of the structures and methods illustrated herein may be employed in other types of systems.

DETAILED DESCRIPTION

Overview

A social networking system offers its users the ability to communicate and interact with other users of the system. In use, users join the social networking system and then add connections to a number of other users to whom they desire to be connected. As used herein, the term "friend" refers to any other user to whom a user has formed a connection, association, or relationship via the system. Connections may be added explicitly by a user, for example, the user may select a particular other user to be a friend, or may be automatically created by the social networking site based on common characteristics of the users (e.g., users who are alumni of the same educational institution). Connections in social networking systems are usually in both directions, but need not be, so the terms "user" and "friend" depend on the frame of reference. For example, if Bob and Joe are both users and connected to each other in the system, Bob and Joe are also each other's friends. The connection between users may be a direct connection; however, some embodiments of a social networking system allow the connection to be indirect via one or more levels of connections. Also, the term friend need not require that users actually be friends in real life, (which would generally be the case when one of the users is a business or other entity); it simply implies a connection in the social networking system. In some instances, users may upload various content items to the social networking system, such as image files, media, etc. Such files can be accessed by other users of the social networking system. For example, a user's friend may be able to view an image file uploaded by the user.

In one embodiment, a social networking system includes a file storage system that leverages both exhaustible and non-exhaustible storage for the storage of various content items (e.g., data files such as image files, word processing documents, media, etc.). In one embodiment, the exhaustible storage may include storage devices that have a theoretical lifetime of data operations that is less than the theoretical lifetime data operations of the devices of the non-exhaustible storage. In certain embodiments, the devices of the exhaustible storage may each be reliably rewritten less than 100,000 times, less than 10,000 times, less than 1,000 times, 100 times or anywhere in between 100 and 100,000 times per page of the device. Likewise, the devices of the non-exhaustible storage may each be reliably rewritten more than 100 times, more than 1,000 times, more than 10,000 times, or more than 100,000 times per page.

In one embodiment, the file storage system may store, in its exhaustible storage, content items received from one or more users. The file storage system may additionally store metadata and error correction information for the content items and/or the file storage system in the non-exhaustible storage. The metadata may include any suitable information for maintaining or supporting the content items, an application using the content items, and/or file storage system. More specifically, the metadata may enable content items to be suitably retrieved and stored in the exhaustible storage. For example, the metadata may include index information for the stored content items, access patterns for the content items, access patterns for the exhaustible storage, and/or the like. The error correction information may include data for the content items that is usable for determining the integrity of the content items. In one embodiment, the total storage capacity for the exhaustible storage may exceed that of the non-exhaustible storage. For example, the exhaustible storage may comprise of 80% or more of the total storage capacity for the file storage system. The non-exhaustible storage, accordingly, may comprise of 20% or less of the total storage capacity of the file storage system.

In one embodiment, the file storage system globally manages and optimizes the exhaustible storage. In the embodiment, the exhaustible storage may comprise of one or more exhaustible storage devices. For example, the exhaustible storage may include hundreds or thousands of lower grade flash based storage devices. During operation, the file storage system may identify the access patterns for the content items stored in the exhaustible storage. For example, the file storage system may identify the number of times an image file stored in the exhaustible storage has been modified in the past 24 hours. The file storage system may additionally identify the number of data operations (e.g., write operations) performed on each of the exhaustible storage devices comprising the exhaustible storage.

Based on such information, the file storage system may shift or move the content items among the storage devices of the exhaustible storage. More specifically, the file storage system may move "hot" content items (e.g., content items with a relatively large number of accesses in a given period) to "fresher" exhaustible storage devices (e.g., exhaustible storage devices having a relatively small number of data operations). Likewise, the file storage system may move "cold" content items to less "fresh" exhaustible storage devices. In this way, the number of data operations performed on the less "fresh" exhaustible storage devices can be minimized. In one embodiment, content items stored on exhaustible storage devices nearing their lifetime number of data operations may be moved off of the exhaustible storage devices. The exhaustible storage devices may additionally be marked for replacement. In other embodiments, data determined to be highly unlikely to change in the future can be moved onto the exhaustible storage devices close to their lifetime number of data operations.

In one embodiment, the file storage system may globally manage and optimize the storage of content items across large scales, such as between various data centers. Illustratively, the file storage system may shift "hot" content items to "fresher" data centers. Such "fresher" data centers may include exhaustible storage devices that, as a whole, have had relatively small numbers of data operations. Likewise, the file storage system may shift "cold" content items to "less fresh" data centers. Such "less fresh" data centers may include exhaustible storage devices that, as a whole, have had relatively large numbers of data operations.

By storing data in both exhaustible and non-exhaustible storage in the manner described, embodiments enable reliable and more cost effective data storage. In particular, embodiments allow costs to be minimized by employing low cost and energy efficient exhaustible storage devices to handle the bulk of data storage rather than more expensive non-exhaustible storage options. Further, by employing a limited amount of non-exhaustible storage devices to store frequently updated information (e.g., metadata, error correction information, etc.), the number of data operations performed on the exhaustible storage devices can be minimized. Additionally, by globally optimizing the exhaustible storage devices based on access patterns, the operational lifetime of the exhaustible storage devices can be extended. As a result, the need to replace expended exhaustible storage devices over time can be reduced. Further, the global optimization of the exhaustible storage enables the file storage system to maintain a data integrity profile similar to non-exhaustible storage options. More specifically, by shifting content items across multiple exhaustible storage devices, embodiments enable the exhaustible storage as a whole to preserve data at a rate similar to non-exhaustible storage options. As a result, the traditional problems of utilizing exhaustible storage as the primary storage for content items can be alleviated.

In one embodiment, content items may be stored in both the exhaustible and non-exhaustible storage. In particular, after receiving one or more content items, the file storage system may store copies of the content items in both the exhaustible storage and the non-exhaustible storage. Metadata for the copies of the content items may be stored in the non-exhaustible storage. During operation, accesses to the content items may be monitored. In one embodiment, the accesses to the content items may be performed on the copies stored in the non-exhaustible storage (e.g., the content items may be retrieved from the non-exhaustible storage). In monitoring the accesses to the content items, the frequency in which the content items are accessed can be determined. If the frequency of the accesses to a content item falls below a defined threshold, the content item may be deleted from the non-exhaustible storage, and kept only in the exhaustible storage. Thereafter, accesses to the content item can be performed on the copy stored in the exhaustible storage.

In one embodiment, various copies of content items may be stored, deleted, and/or optimized based on geography. More specifically, the file storage system may store copies of a content item in both the non-exhaustible and exhaustible storage as well as across different data centers servicing different geographical regions. Illustratively, the file storage system may store copies of a content item in both the non-exhaustible and exhaustible storage devices of the system that are located in data centers in the United States. The file storage system may additionally store copies of the content item in both the non-exhaustible and exhaustible storage devices of the system that are located in the data centers in Europe. The file storage system may store the content item in such a manner in order to ensure that wherever a viewer of the content item is located, access to the content item can be performed with an acceptable amount of latency. In one embodiment, the file storage system can optimize the storage of the content items across the non-exhaustible and exhaustible storage devices of various data centers. In one embodiment, the geographic region of a user that uploaded a content item can be determined. Thereafter, for geographic regions in which the user is not located, the file storage system may store only a copy of the content item in the exhaustible storage devices of the data center that services the region. The file storage system may do so because it is unlikely that the content item will be accessed frequently outside of the uploading user's geographical region.

FIG. 1 illustrates a diagram showing the storage and retrieval of a content item in a file storage system 175 of the social networking system 100. As shown in FIG. 1, the file storage system includes a file management module 190 and additional components 195. In one embodiment, the file management module 190 receives a content item 102. The content item 102 may have been received from a client device operated by a user of a social networking system 100. After receiving the content item 102, the file management module 190 stores the content item 102 in the exhaustible storage 180. In one embodiment, the exhaustible storage 180 may include one or more exhaustible storage devices. In storing the content item, the file management module 190 selects a particular exhaustible storage device of the exhaustible storage 180 to store the content item. The file management module 190 may select an exhaustible storage device for storing the content item based on any suitable criteria. In one embodiment, the file management module 190 may select an exhaustible storage device based on the access patterns for the exhaustible storage device, the access patterns for other storage devices of the exhaustible storage 180, the predicted access patterns for the content item 102, and/or the like. After selecting the exhaustible storage device, the file management module 190 stores the content item in the selected device. In one embodiment, the file management module 190 may select multiple exhaustible storage devices, and store a content item across multiple selected exhaustible storage devices.

Furthermore, the file management module 190 stores the metadata 104 in the non-exhaustible storage 185. The metadata can be any suitable information required to maintain or support the content item, an application leveraging the file storage system (e.g., an online photo storage application), and/or file storage system. For example, the metadata can include an index specifying the exhaustible storage device on which the content item is stored. The metadata can additionally include other information such as the access patterns for the content item, the access patterns for each of the exhaustible storage devices that comprise the exhaustible storage 180, etc. As another example, a content item may be a photo or a video (which are not usually modified) uploaded by a user and stored in the exhaustible storage 180. The metadata for the photo or video may include the user's connections' (e.g., friends) interactions with the photo or video. Illustratively, the metadata may include information regarding people tagged in the photo or video, connections that liked or shared the photo or video, and/or any other data that are updated frequently in a social networking environment.

At a later time, the file management module 190 can additionally retrieve the content item 102 from the exhaustible storage 180. In particular, the file management module 190 may receive a request to retrieve the content item 102 from a user via a client device. The file management module 190 may reference the metadata data 104 stored on the non-exhaustible storage 185 to identify the location of the content item 102. Thereafter, the file management module 190 may retrieve the content item 102 from the exhaustible storage 180 and provide the content item 102 to the requesting client device.

System Architecture

Figure 2A:
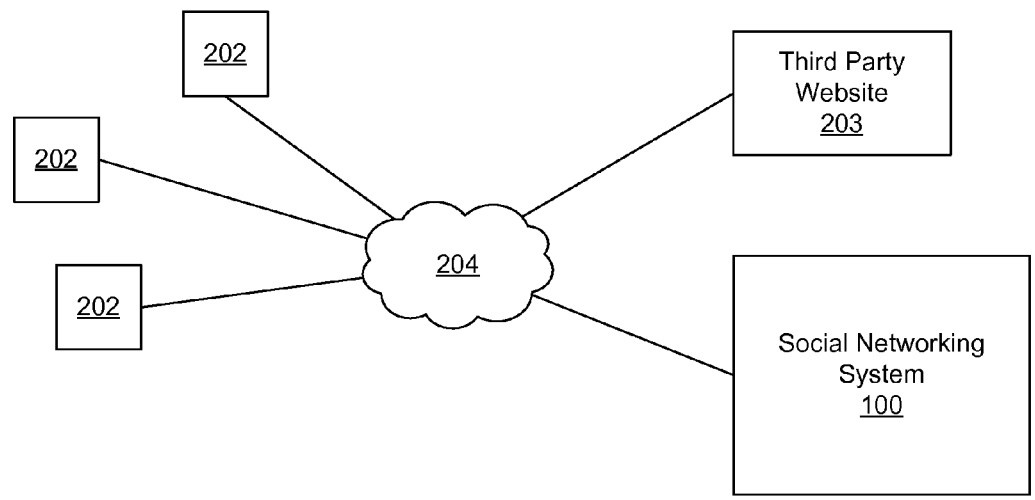
FIG. 2A is a high level block diagram illustrating a system environment suitable for operation of a social networking system, in accordance with an embodiment of the invention.

FIG. 2A is a high level block diagram illustrating a system environment suitable for operation of a social networking system 100. The system environment includes one or more client devices 202, one or more third-party websites 203, a social networking system 100, and a network 204. While only three client devices and one third-party website are shown in FIG. 2A, it should be appreciated that any number of these entities (including millions) can be included. In alternative configurations, different entities can also be included in the system.

The network 204, in general, can be any network, including but not limited to any combination of the Internet, a mobile network, a LAN, a wired or wireless network, a private network, and/or a virtual private network.

The client devices 202 include one or more computing devices that can receive user input and can transmit and receive data via the network 204. For example, the client devices 202 may be desktop computers, laptop computers, tablet computers (pads), smart phones, personal digital assistants (PDAs), or any other device including computing functionality and data communication capabilities. The client devices 202 are configured to communicate via network 204, which may include any combination of local area and/or wide area networks, using both wired and wireless communication systems. The client devices 202 can provide a means by which various users can communicate with the social networking system 100. The third party website 203 is coupled to the network 204 in order to communicate with the social networking system 100.

The social networking system 100 includes a computing system that allows users to communicate or otherwise interact with each other and access content as described herein. In one embodiment, the social networking system 100 stores user profiles that describe the users of a social network, including biographic, demographic, and other types of descriptive information, such as work experience, educational history, hobbies or preferences, location, and the like. The social networking system 100 additionally enables users to upload content items such as image files, media files, documents, etc. The social networking system 100 can thereafter store the uploaded content items in the file storage system 175, as will be discussed in greater detail.

Figure 2B:
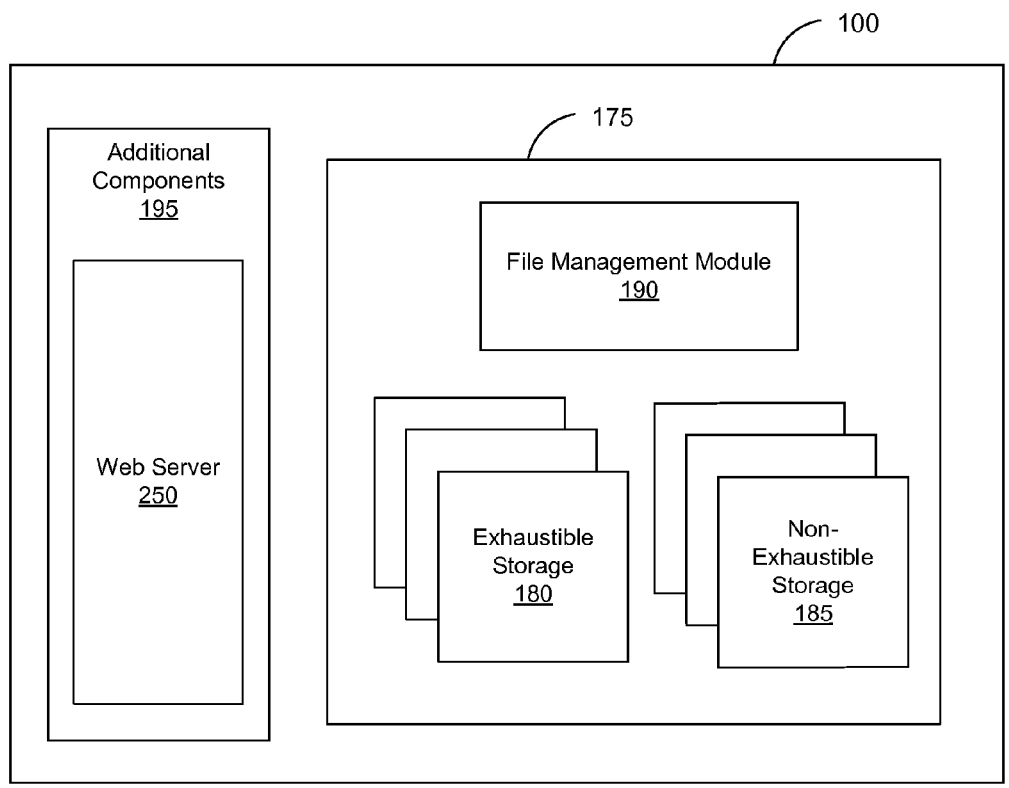
FIG. 2B is a block diagram of various components of a social networking system, in accordance with an embodiment of the invention.

FIG. 2B is an example block diagram of various components of the social networking system 100. As shown in FIG. 2B, the social networking system 100 includes additional components 195 and a file storage system 175. In alternative configurations, different and/or further components can be included in the social networking system 100.

The additional components 195 can include any suitable components for facilitating the storage of content items. In general, the web server 250 of the additional components 195 links the social networking system 100 via the network 204 to one or more of the client devices 202, as well as to one or more third party websites 203. The web server 250 may include a mail server or other messaging functionality for receiving and routing messages between the social networking system 100 and the client devices 202 or third party websites 203. The messages can be chat messages (e.g., instant messages), queued messages (e.g., email), text and SMS messages, or any other suitable messaging technique. In some instances, the web server 250 can receive content items for storage in the file storage system 175 from the client devices 202 of one or more users. In response to receiving the content items, the web server 250 may send the content items to the file storage system 175 for storage. In other instances, the web server 250 may receive requests for content items stored in the file storage system 175. In response, the web server 250 may retrieve the requested content items from the file storage system 175.

The file storage system 175 stores content items for the social networking system 100. For example, the file storage system 175 may receive image files, media files, documents, and/or other types of data uploaded by a user to the social networking system 100 via a client device 202. As shown in FIG. 2B, the file storage system 175 includes an exhaustible storage 180, a non-exhaustible storage 185, and a file management module 190.

In one embodiment, the exhaustible storage 180 stores a number of content items received by the file storage system 175 from one or more client devices 202. For example, the exhaustible storage 180 may store image files received from one or more users of the social networking system 100. In one embodiment, the exhaustible storage 180 may include a set of interconnected exhaustible storage devices. For example, the exhaustible storage 180 may include hundreds or thousands of individual exhaustible storage devices. The exhaustible storage devices may be, in one embodiment, interconnected using relatively low cost SATA or USB connections. In one embodiment, the exhaustible storage devices may be operated in a "redundant array of independent disks" (RAID) configuration at the hardware level. In the embodiment, the exhaustible storage devices may be managed by a hardware RAID controller. In another embodiment, the exhaustible storage devices may be operated in a RAID configuration at the software level. In the embodiment, the exhaustible storage devices may be configured at the hardware level as "just a bunch of drives" (JBOD). However, the file storage system 175 may operate the exhaustible storage devices in a RAID configuration at the software level. In the embodiment, data for the RAID configuration is stored in a portion of the exhaustible storage 180.

In one embodiment, each exhaustible storage device may have a theoretical number of lifetime data operations that is less than a theoretical number of lifetime data operations for the non-exhaustible storage 185. Illustratively, each of the exhaustible storage devices may have a theoretical number of lifetime write operations (e.g., specifically, program-erase cycles) that is less than the theoretical number of lifetime write operations for the non-exhaustible storage 185. In one embodiment, the exhaustible storage devices may each be a flash type storage device. For example, the exhaustible storage devices may each be either a lower grade NAND-based storage device or a NOR-based storage device. In one embodiment, the exhaustible storage devices may internally include a simplified or unsophisticated flash translation layer. For example, the exhaustible storage devices may not have logic for wear leveling. Such logic may be included in the file management module 190. In other embodiments, the exhaustible storage device may not have a flash translation layer. Rather, as discussed, the wearing leveling logic can be performed by the file management module 190.

In one embodiment, the non-exhaustible storage 185 stores metadata, error correction information, and/or any other frequently modified data. For example, the non-exhaustible storage 185 may store an index indicating the storage locations for the content items stored in the exhaustible storage 180. The non-exhaustible storage 185 may additionally store access pattern information for the content items stored in the exhaustible storage 180. For example, non-exhaustible storage 185 may store access pattern information indicating how many times a particular content item has been retrieved and/or modified. The non-exhaustible storage 185 may further store access pattern information for the various exhaustible storage devices comprising the exhaustible storage 180. For example, the non-exhaustible storage 185 may store access pattern information indicating the number of data operations a particular exhaustible storage device of the exhaustible storage 180 has experienced over its lifetime. Such information may be logged during operation of the file storage system as data operations performed on the exhaustible storage devices are identified. The non-exhaustible storage 185 may moreover store error correction information for the content items stored on the non-exhaustible storage. The non-exhaustible storage 185 may moreover store any other data that requires a relatively large number of updates or modification.

In one embodiment, the non-exhaustible storage 185 may include a set of interconnected non-exhaustible storage devices. Each non-exhaustible storage device may have a theoretical number of lifetime data operations that exceeds the theoretical number of lifetime data operations for the storage devices comprising the exhaustible storage device 180. In one embodiment, each of the non-exhaustible storage devices may be a conventional desktop hard drive based on a magnetic recording mechanism and/or higher grade flash storage.

The file management module 190 centrally facilitates and manages the coordinated storage of content items on the exhaustible storage 180 and the non-exhaustible storage 185. For example, the file management module 190 may perform adaptive wear-leveling (e.g., shifting data in order to minimize storage device wear) across the devices of the exhaustible storage 180. In one embodiment, the file management module 190 receives a number of content items from the client devices 202. Each content item may, for example, be an image file, a video file, an audio file, and/or the like. In one embodiment, the contents of each content item may be encoded using a suitable image or audio encoding technique that enables the file management module 190 to more easily account for and recover from errors.

After receiving each content item, the file management module 190 selects a location in the exhaustible storage 180 to store the content item. More specifically, the file management module 190 selects a specific exhaustible storage device of the storage 180 to store each content item. For example, the file management module 190 may select a particular flash drive from a set of interconnected flash drives that comprise the exhaustible storage 180. The file management module 190 may select the location to store the content item in any suitable manner. In one embodiment, the file management module 190 may select the location based on the access patterns for the storage devices of the exhaustible storage and/or the estimated access patterns for the content item.

More specifically, the file management module 190 may identify the number of total lifetime data operations (e.g., write operations) for each storage device of the exhaustible storage 180. In one embodiment, such information may be identified by retrieving access pattern information stored in the non-exhaustible storage 185. The access pattern information may log the data operations performed on each storage device during operation of the file storage system 175. The file management module 190 may additionally estimate the future access patterns for the received content item. In particular, the file management module 190 may estimate the number of times the received content item will be read or modified. Such an estimation may be based on how frequently the user who transmitted the content item logs into the social networking system 100, how frequently the user retrieves or updates content items or certain content types, how frequently the user interacts with his or her friends over the social networking system 100, the content of the content items, various social signals, etc.

For example, the file management module 190 may estimate that the received content item will be modified relatively often because the user of the content item has historically updated his or her content items very frequently. As another example, the file management module 190 may estimate that the received content item will be modified relatively often based on the content included in the content item, the social graph associated with the content item, etc. Illustratively, a content item may include an image of a user's family members or close friends. The file management module 190 may determine, based on tags associated with the content item and/or image recognition processing, that the content item includes an image of user's family members or close friends. Because images of a user's family members and/or close friends are more likely to be accessed, the file management module 190 may estimate that the received content item will be accessed relatively frequently.

After determining the access patterns, the file management module 190 selects an exhaustible storage device to store the content item. In one embodiment, the file management module 190 may select an exhaustible storage device that has experienced relatively few data operations if it is estimated that the content item will be updated frequently relative to the other content items stored in the exhaustible storage. Likewise, the file management module 190 may select an exhaustible storage device that has experienced a relatively large number of data operations if it is estimated that the content item will be rarely updated relative to the other content items stored in the exhaustible storage. By selecting a storage location for each content item in this way, the file management module 190 can enable the operational lifetime of the storage devices of the exhaustible storage 180 to be prolonged. After selecting the locations for the content items, the file management module 190 stores the content items in the selected locations.

In one embodiment, the file management module 190 additionally stores various types of metadata and/or other information for any stored content items on the non-exhaustible storage 185. More specifically, the file management module 190 may store an index in the non-exhaustible storage 185. The index may indicate the storage locations for the content items stored by the file management module 190 in the exhaustible storage 180. For example, the index may be a table of key value-pairs. In particular, the table may include an identifier for each content item stored in the exhaustible storage 180 paired with an address indicating the storage location for the content item. The index may be later referenced in order to determine the location of the content item and retrieve the content item from the exhaustible storage 180.

In one embodiment, the file management module 190 may further store access pattern information for the stored content items in the non-exhaustible storage 185. In particular, the file management module 190 may monitor for accesses (e.g., updates) to each content item. In response to identification that a content item has been accessed, the file management module 190 may log the access in the access pattern information for the content item, where the access pattern information is stored in the non-exhaustible storage 185.

The file management module 190 may further compute and store error correction information for the stored content items. More specifically, the file management module 190 may compute error correction information for a subset of the content items stored on the exhaustible storage 180. For example, the file management module 190 may select those content items stored on the same storage device of the exhaustible storage 180. Based on the selected content items, the file management module 190 may compute error correction information for the content items (e.g., error correcting codes). Such information can thereafter be stored on the non-exhaustible storage 185. Because the error correction information may span several content items, the information may frequently change as modification of a single content item may require an update. As a result, in order to reduce the number of data operations performed on the exhaustible storage, the error correction information for the content items is stored in the non-exhaustible storage 185.

The file management module 190 may further store access pattern information for the storage devices that comprise the exhaustible storage 180 in the non-exhaustible storage 185. In one embodiment, the access pattern information may indicate the number of data operations performed on each storage device. For example, the access pattern information may indicate the number of write operations (e.g., specifically, program-erase cycles) experienced per page of a particular flash drive of the exhaustible storage 180. In one embodiment, the file management module 190 may continually monitor for data operations performed on each storage device of the exhaustible storage 180. Responsive to a data operation, the file management module 190 may update the access pattern information for the storage device, where the access pattern information is stored on the non-exhaustible storage 185. For example, the file management module 190 may determine that a particular flash drive of the exhaustible storage 180 has experienced a write operation. As such, the file management module 190 may increment a write operation count for the flash drive by one.

In one embodiment, the file management module 190 globally optimizes the exhaustible storage 180 during operation. In particular, the file management module 190 may shift the stored content items across the set of storage devices comprising the exhaustible storage 180 such that the lifetime of the storage devices can be prolonged. In one embodiment, the file management module 190 initiates the optimization of the exhaustible storage by first determining the access patterns for the exhaustible storage and/or for the content items stored in the exhaustible storage. In particular, the file management module 190 may determine the access patterns for the exhaustible storage 180 by retrieving the storage 180's access pattern information from the non-exhaustible storage 185. In one embodiment, the determined access patterns may include the number of data operations (e.g., write operations) performed on each of the exhaustible storage devices comprising the exhaustible storage 180. Illustratively, the determined access patterns may include data indicating that a first exhaustible storage device has experienced 10,000 write operations and a second exhaustible storage device has experienced 1,000 write operations.

In one embodiment, the file management module 190 further estimates the future access patterns for the content items stored in the exhaustible storage 180. In one embodiment, the file management module 190 identifies the future access patterns for the content items based on the historic access patterns for the content items stored in the non-exhaustible storage 185. More specifically, the file management module 190 may determine the number of times a particular content item has been modified or retrieved by retrieving access pattern information for the content item from the non-exhaustible storage 185. Based on the number of accesses performed on the content item, the file management module 190 estimates a number of times each content item will be accessed in the future. For example, a particular content item stored on an exhaustible storage device may have been accessed a relatively large number of times over the last 24 hours. As a result, the file management module 190 may estimate that the exhaustible storage device may expect to experience a similarly large number of accesses in the future.

In one embodiment, the file management module 190 may additionally determine the access patterns for the content items based on information regarding the content of the content items, the users associated with the content items and/or various other social networking signals. For example, the access patterns for a particular content item may be based on the users tagged or associated with the content item (e.g., close friends or family), the number of user interactions with the content (e.g., likes, comments, etc.). As another example, a particular content item may have been uploaded by a relatively active user. As a result, the file management module 190 may estimate that the content item may experience a large number of data operations in the future. Such a determination may be based on how frequently the user logs into the social networking site, how frequently the user uploads or updates content items or certain content types, how frequently the user interacts with his or her friends over the social networking site, etc.

Based on the determined access patterns, the file management module 190 optimizes the storage of the content items across the exhaustible storage 180. In particular, the file management module 190 may move content items that are estimated to be accessed frequently in the future onto exhaustible storage devices that have experienced relatively few data operations. For example, the file management module 190 may move content items that have been accessed (e.g., modified) above a certain threshold (or access rate, function curve fit, etc.) to exhaustible storage devices that have not had many data operations. Likewise, the file management module 190 may move content items that are estimated to be accessed relatively infrequently in the future onto exhaustible storage devices that have had a relatively large number of data operations. For example, the file management module 190 may move content items that have been accessed below a certain threshold (or access rate, function curve fit, etc.) to exhaustible storage devices that have had many data operations. In one embodiment, content items that have been accessed below a particular threshold and moved to exhaustible storage devices having relatively large number of data operations may be more highly compressed. In doing so, the content items may take up less space on the exhaustible storage devices.

In one embodiment, the file management module 190 may optimize the storage of the content items based on the type of accesses made to the content items. In particular, content items having relatively large numbers of write type accesses and/or relatively few numbers of read type accesses may be moved to exhaustible storage devices that have experienced fewer numbers of write data operations. In contrast, content items having relatively large numbers of read type access and/or relatively few numbers of write type accesses may be moved to exhaustible storage devices that have experienced larger numbers of write data operations. The file management module 190 may perform such an optimization because, as a general matter, exhaustible storage devices wear down with each write type data operation. Thus, optimizing the exhaustible storage devices in this way can further serve to prolong the operational lifetimes of the exhaustible storage devices in the exhaustible storage.

In one embodiment, content items having been stored in the exhaustible storage longer than a certain time period may also be automatically moved to exhaustible storage devices that have had relatively few data operations. By shifting content items in the manner described, the file management module 190 can prolong the operational lifetime of exhaustible storage devices with relatively high number of operations. In one embodiment, if the number of accesses to a content item drops below a threshold, the content items may be encrypted.

In one embodiment, the file management module 190 additionally updates the data stored in the non-exhaustible storage 185 to reflect the optimization. More specifically, the file management module 190 can update the index stored in the non-exhaustible storage 185 to indicate the new locations for the content items. The file management module 190 can additionally update the error correction information stored in the non-exhaustible storage 185.

In one embodiment, the file management module 190 may identify storage devices in the exhaustible storage 180 that are nearing their lifetime number of data operations. The file management module 190 may identify the storage devices based on the access pattern information stored in the non-exhaustible storage 185. Upon identifying a storage device nearing its operational lifetime number of data operations, the file management module 190 may automatically shift the content items stored on the storage device to another storage device of the exhaustible storage 180. The file management module 190 may additionally mark the storage device as being unsuitable for data storage, and in need of replacement. In this way, data stored by the exhaustible storage 180 can be preserved. In one embodiment, the file management module 190 can provide a notification to a system operator that an exhaustible storage device is nearing its operational lifetime number of data operations.

In one embodiment, the file management module 190 may store the content items in a format that is tolerant to errors within the content item. More specifically, the exhaustible storage may have a data error rate that is relatively high. As a result, the content items stored in the exhaustible-storage may experience relatively large amounts of errors. By storing the items in a format tolerant to errors, the content items can be provided to users without the users being able to perceive such errors. In one embodiment, the content items may be stored in the JPEG 2000 format.

In one embodiment, the file management module 190 stores multiple data objects in the exhaustible storage 180. Each data object may be tens, hundreds, thousands, or more gigabytes in size. Each data object may be configured to store one or more content items. For example, three hundred content items may be stored within a data object stored in the exhaustible storage 180.

In the embodiment, the exhaustible storage 180 is additionally divided into multiple logical data blocks. A data block can be the smallest granularity for data access in the exhaustible storage 180. In one aspect, a data block may be equal to or larger than the physical blocks of each exhaustible storage device comprising the exhaustible storage 180. In one embodiment, each individual data block is indexed and accessed independently. Thus, the access pattern information (e.g., write counts) for the file storage system 175 may be maintained at a data block granularity. As discussed, the access pattern information can be used to globally optimize the storage of data in the exhaustible storage 180.

In one embodiment, the file management module 190 utilizes a suitable error correction scheme that utilizes erasure codes. Such erasure codes may utilize distributed parity data stored in the exhaustible storage 180 to protect the data of the file storage system 175.

In one embodiment, the data and parity information can be maintained in a vertically partitioned erasure coding scheme. In the embodiment, a parity code is computed for each data object. Different data blocks of each content item in a data object are stored in one or two locations (e.g., multiple servers). Under normal operation, the file management module 190 performs one or two read operations in order to retrieve a content item.

Figure 2C:
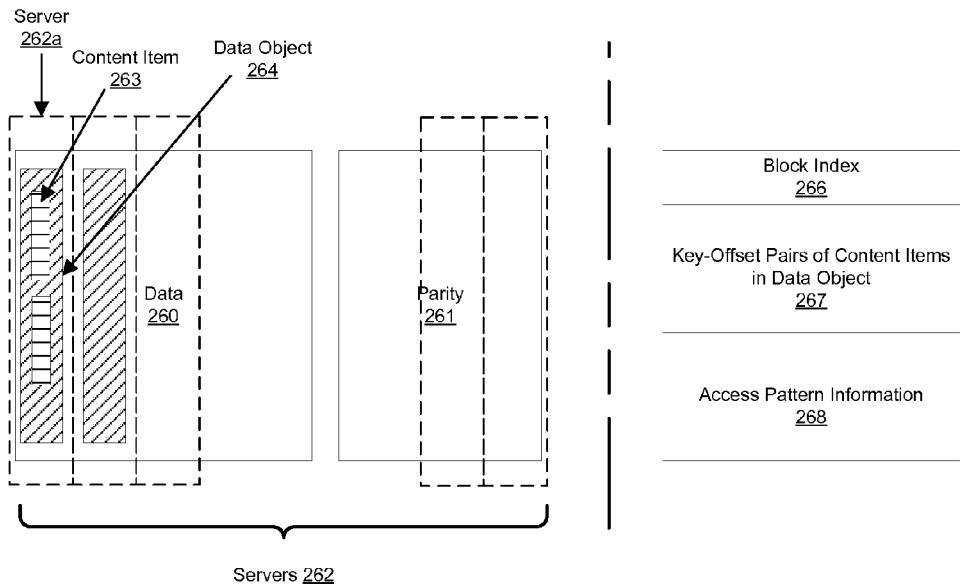
FIG. 2C is a block diagram illustrating an example of a vertically partitioned erasure coding scheme, in accordance with an embodiment of the invention.

FIG. 2C illustrates the storage of data and parity information based on a vertically partitioned erasure coding scheme. As shown in FIG. 2C, the file management module 190 stores the data 260 and parity information 261 for the data in the exhaustible storage 180 over multiple servers 262. In FIG. 2C, a data object 264 stored in the exhaustible storage 180 is shown as including multiple content items, such as the content item 263. As further shown in a FIG. 2C, the data object 264 and, accordingly, the data object 264's content items are stored in a single server 262a in a logically vertical manner. Thus, in order to retrieve the content item 263 of the data object 264, one read operation is performed. In one embodiment, the file management module 190 computes a parity code for the entire data object 264. The computed parity code may be stored as part of the parity information 261.

As further shown in FIG. 2C, the non-exhaustible storage 185 stores the block index 266, key-offset pair data 267, and access pattern information 268. The block index 266 maintains mappings between the data objects storing the content items of the data 260 and the data blocks of the exhaustible storage 180. The key-offset pairs data 267 provides information regarding the logical storage locations of content items within a data object. More specifically, the key-offset pairs data includes a set of keys and a set of offsets corresponding to the keys. Each key is assigned to a particular content item of the data object. The offset that corresponds to the key represents the logical storage location of the particular content item within the data object. Thus, when locating a content item in a particular data object, the key-offset pairs data 267 can be referenced in order to identify the specific location of a content item in the particular data object. In one embodiment, the non-exhaustible storage 185 may store information regarding the one or more servers storing the various content items of the data 261. In one implementation, the servers storing the content items are specified separately from the offsets of the key-offset pairs data 267. In one implementation, object IDs are used for rendering the one or more servers storing the various content items. The access pattern information 268 provides data regarding the access patterns for the data blocks of the data stored in the exhaustible storage 180. For example, the access pattern information can include information including the number of operations that have been performed on the data blocks of the exhaustible storage 180. Such information can be used in order to globally optimize the content items stored in the exhaustible storage 180 over time.

In another embodiment, data and parity information can be maintained in a horizontally partitioned erasure coding scheme. In the embodiment, parity codes are computed for small chunks of each data object stored in the exhaustible storage 180. Furthermore, the various data blocks comprising a content item in a data object are stored in multiple locations for data security. Because the data blocks of a content item are distributed across multiple locations (e.g., multiple servers), to retrieve a content item, the file management module 190 performs multiple read operations.

Figure 2D:
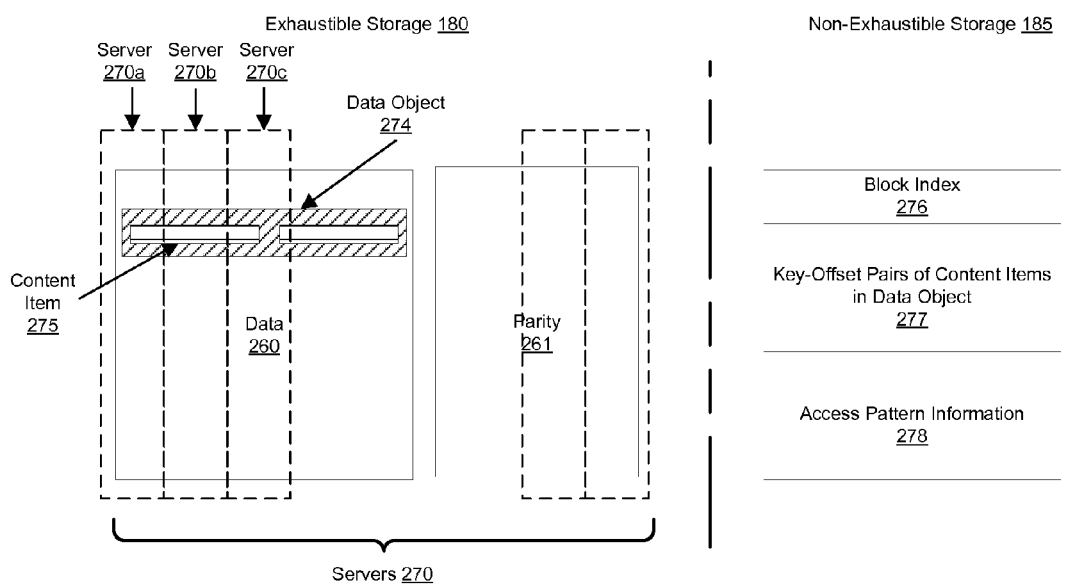
FIG. 2D is a block diagram illustrating an example of a horizontally partitioned erasure coding scheme, in accordance with an embodiment of the invention.

FIG. 2D illustrates the storage of data and parity information based on a horizontally partitioned erasure coding scheme. As shown in FIG. 2D, the file management module 190 stores data 260 and parity information 261 in the exhaustible storage 180 over multiple servers 270. In FIG. 2D, a data object 274 stored in the exhaustible storage 180 is shown as including multiple content items, such as the content item 275. As further shown in FIG. 2D, the data object 274 is stored in multiple servers 270 in a logically horizontal manner. Because the data object 274 is stored across multiple servers, the content files of the data object 274 are also stored across multiple servers. For example, the content item 275 is stored in the servers 270a, 270b, and 270c. Thus, to retrieve a content item of the data object 274, multiple read operations to multiple servers are required to be performed. In one embodiment, the file management module 190 computes a parity code for each chunk or portion of the data object 274 stored in a particular server. For example, the file management module 190 may compute a parity code for the chunk of the data object 274 stored in the server 270a. The computed parity code may be stored as part of the parity information 261.

As further shown in FIG. 2D, the non-exhaustible storage 185 stores the block index 276, key-offset pairs 277, and access pattern information 278. The block index 276, key-offset pairs data 277, and access pattern information 278 can be similar to the block index 266, key-offset pair data 267, and access pattern information 268 of FIG. 2C. In particular, the block index 276 maintains mappings between the data objects storing the content items of the data 260 and the data blocks of the exhaustible storage 180. The key-offset pairs data 277 provides information regarding the logical storage locations of content items within a data object. In one embodiment, the non-exhaustible storage 185 may store information regarding the one or more servers storing the various content items of the data 261. The manner in which such information is stored and used can be similar to that discussed with respect to FIG. 2C. The access pattern information 278 provides data regarding the access patterns for the data blocks of the data stored in the exhaustible storage 180.

Figure 2E:
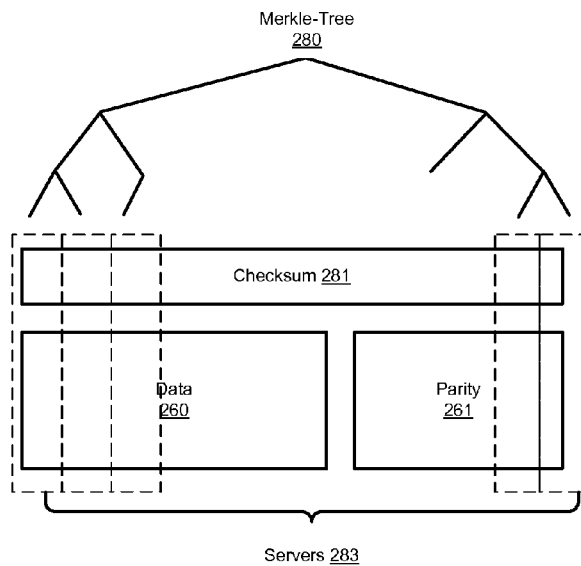
FIG. 2E is a diagram illustrating an example of the manner in which a Merkle-tree is used to manage checksum data, in accordance with an embodiment of the invention.

In yet another embodiment, the data and parity information can be maintained using a Merkle-tree based erasure coding scheme. In the embodiment, a checksum is generated for both the data and parity information stored in the exhaustible storage 180. To efficiently manage these checksums, the file management module 190 utilizes a hash tree of all the checksum data. FIG. 2E illustrates the manner in which a Merkle-tree or hash-tree 280 can be used to efficiently manage checksum data 281 for the data 260 and the parity information 261. In utilizing the Merkle-tree based erasure coding scheme, the file management module 190 performs one or two read operations in order to retrieve a content item. In the embodiment, the checksum data is stored in the exhaustible storage 180. Data for the Merkle-tree is stored in the non-exhaustible storage 185.

Figure 2F:
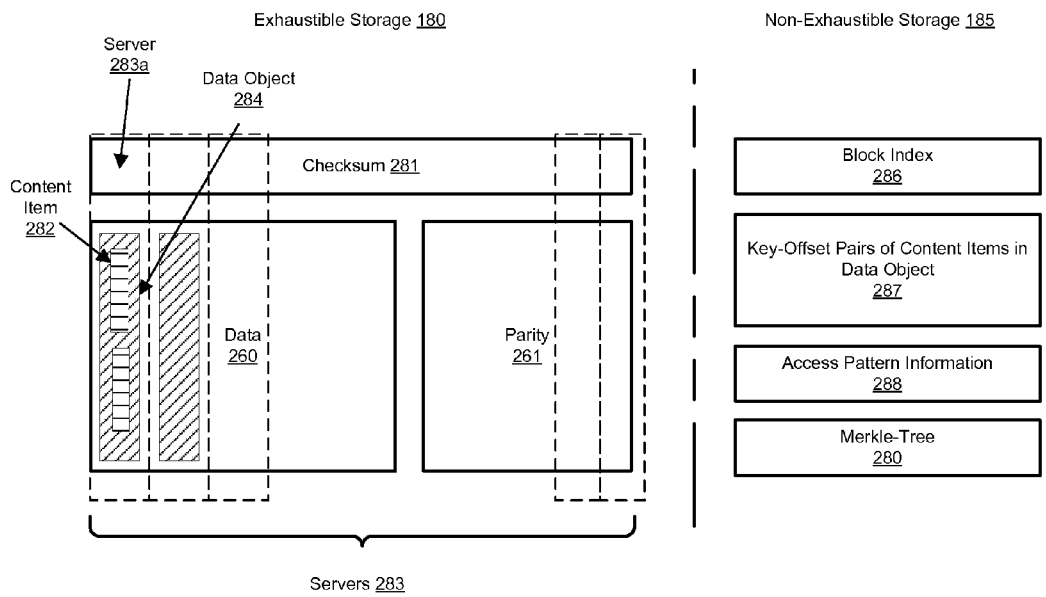
FIG. 2F is a block diagram illustrating an example of a Merkle-tree based erasure coding scheme, in accordance with an embodiment of the invention.

FIG. 2F illustrates an example of the storage of data, parity information, and checksum data based on a Merkle-tree based erasure coding scheme. As shown in FIG. 2F, the file management module 190 stores the data 260, parity information 261, and checksum data 281 in the exhaustible storage 180 across multiple servers 283. In FIG. 2F, a data object 284 stored in the exhaustible storage 180 is shown as including multiple content items, such as the content item 282. As further shown in FIG. 2F, the data object 284 and, accordingly, the data object 284's content items are stored in a single server 283a in a logically vertical manner. Thus, in order to retrieve the content item 282 of the data object 284, one read operation is performed. In one embodiment, the file management module 190 computes a parity code for the entire data object 284. The computed parity code may be stored as part of the parity information 261. In addition, the file management module 190 generates the checksum data 281 for the data 260 and the parity information 261.

As additionally shown in FIG. 2F, the non-exhaustible storage 185 stores the block index 286, key-offset pairs 287, access pattern information 288, and Merkle-tree 280. The block index 286, key-offset pairs 287, and access pattern information 288 can be similar to the block index 266, key-offset pair data 267, and access pattern information 268 of FIG. 2C. In particular, the block index 286 maintains mappings between the data objects storing the content items of the data 260 and the data blocks of the exhaustible storage 180. The key-offset pairs data 287 provides information regarding the logical storage locations of content items within a data object. In one embodiment, the non-exhaustible storage 185 may store information regarding the one or more servers storing the various content items of the data 261. The manner in which such information is stored and used can be similar to that discussed with respect to FIG. 2C. The access pattern information 288 provides data regarding the access patterns for the data blocks of the data stored in the exhaustible storage 180. The Merkle-tree 280 can enable the efficient management of the checksum data 281.

It will be appreciated that the erasure coding schemes described herein are examples of one of many possible schemes for storing data and parity information. Other error corrections schemes can be used without departing from the principles of the invention described herein.

Method for Storing a Content Item

Figure 3:
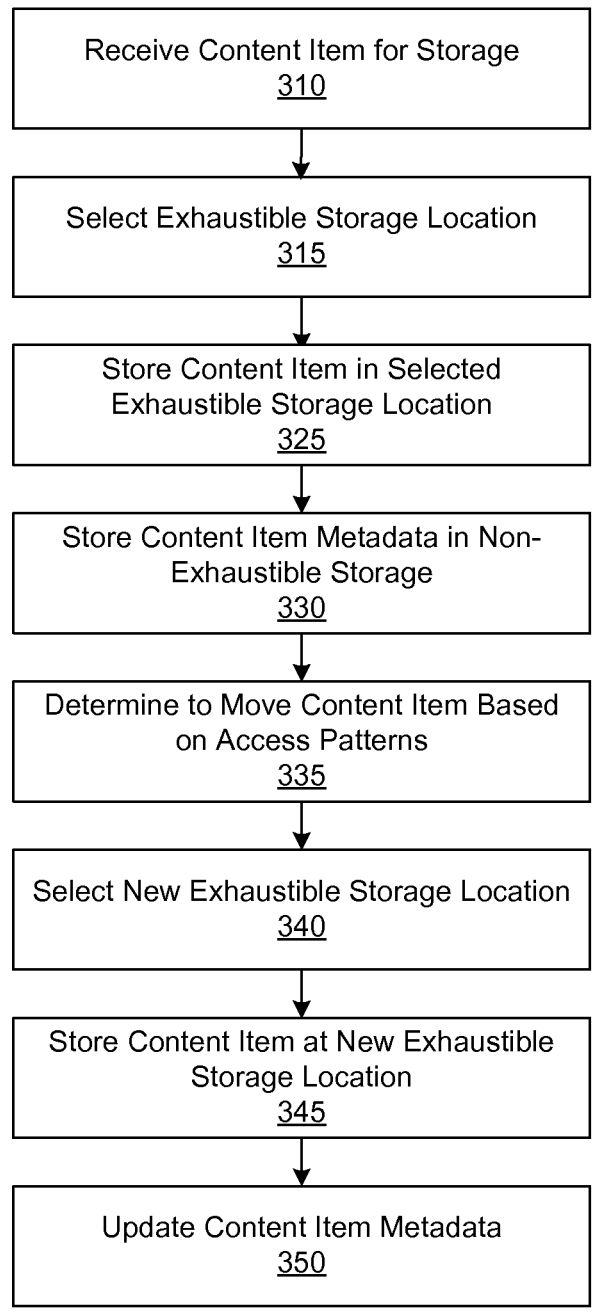
FIG. 3 is a flow chart of a process for storing a content item, in accordance with an embodiment of the invention.

FIG. 3 illustrates one embodiment of a method for storing a content item. In one embodiment, the process receives 310 a content item for storage. The content item may be any suitable item of data received from a user. For example, the content item may be an image file uploaded by a user of the social networking system 100. Upon receiving the content item, the process selects 315 a location in the exhaustible storage 180 of the file storage system 175 for the content item. In one embodiment, the location may be a particular exhaustible storage device of the exhaustible storage 180. The process may select the exhaustible storage location in any suitable manner. For example, the process may select the exhaustible storage location based on the access patterns for the exhaustible storage, an estimated future access pattern for the received content item, etc. The process then stores 325 the content item in the selected exhaustible storage location.

The process additionally stores 330 metadata for the content item and/or file storage system in a non-exhaustible storage 185 of the file storage system 175. The process may moreover store error correction information associated with the content item in the non-exhaustible storage 185. At a later time, the process makes a determination that the exhaustible storage 180 is to be globally optimized. More specifically, the process may globally optimize the exhaustible storage 180 by moving less frequently accessed content items to exhaustible storage locations having experienced relatively large numbers of data operations. Likewise, the process may move more frequently accessed content items to exhaustible storage locations that have experienced relatively few data operations.

As shown in FIG. 3, the process determines 335, during the optimization process, to move the received content item. In one embodiment, the process may determine to move the content item based on the estimated access patterns for the content item and/or the access patterns for the exhaustible storage location. Thereafter, the process selects 340 a new storage location on the exhaustible storage for the content item. The new storage location may be selected based on the access patterns for the new location. After selection of the new storage location, the process stores 345 the content item at the selected new location. Thereafter, the process updates 350 the metadata for the content item stored on the non-exhaustible storage to reflect the move.

Figure 4:
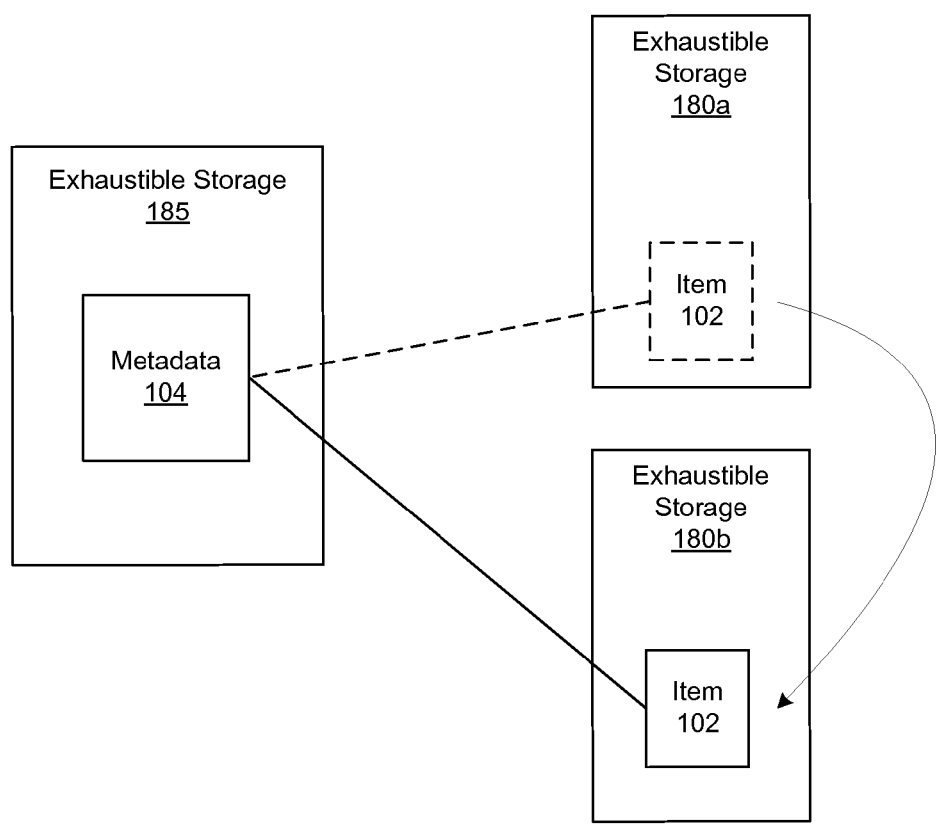
FIG. 4 is a diagram illustrating the shifting of a content item according to access patterns, in accordance with an embodiment of the invention.

As an example, FIG. 4 illustrates the shifting of a content item from one location to another location. In particular, the content item 102 is moved from the exhaustible storage device 180a to the exhaustible storage device 180b. As a result of the move, the metadata 104 is updated to indicate that the content item 102 is now stored on the exhaustible storage device 180b rather than the exhaustible storage device 180a.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may include a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving a content item posted to an online system by a user of the online system for storage by a file system of the online system;
   determining an estimated access pattern for the content item based on a prediction of how frequently the online system modifies the content item posted on the online system by the user;
   selecting at least a first location of an exhaustible storage to store the received content item based at least in part on the estimated access pattern for the content item;
   storing the content item at the selected first location of the exhaustible storage; generating metadata for the content item, wherein the metadata references at least the first location storing the content item and includes information describing online system users' interactions with the content item that was posted to the online system; and
   storing the metadata for the content item in a non-exhaustible storage.

2. The computer-implemented method of claim 1, wherein the first location is selected based at least in part on a number of data operations experienced by the exhaustible storage at the first location.

3. The computer-implemented method of claim 1, further comprising:
   automatically moving the content item from the first location of the exhaustible storage to at least a second location of the exhaustible storage based at least in part on a number of times the content item has been modified, a number of data operations experienced by the exhaustible storage at the first location, and a number of data operations experienced by the exhaustible storage at the second location.

4. The computer-implemented method of claim 1, further comprising:
   determining a number of times the content item has been accessed;
   determining that the number of times the content item has been accessed falls below a threshold number; and
   responsive to the determination that the number of times the content item has been accessed falls below the threshold number, moving the content item from the first location of the exhaustible storage to a second location of the exhaustible storage, wherein the second location has been accessed a greater number of times than the first location.

5. The computer-implemented method of claim 1, further comprising:
   determining a number of times the content item has been accessed;
   determining that the number of times the content item has been accessed exceeds a threshold number; and
   responsive to the determination that the number of times the content item has been accessed exceeds the threshold number, moving the content item from the first location of the exhaustible storage to a second location of the exhaustible storage, wherein the second location has been accessed a fewer number of times than the first location.

6. The computer-implemented method of claim 1, wherein the exhaustible storage includes a plurality of NAND-based storage devices.

7. The computer-implemented method of claim 6, wherein the plurality of NAND-based storage devices each has a theoretical number of lifetime write operations that is less than a theoretical number of lifetime write operations for each of a plurality of storage devices comprising the non-exhaustible storage.

8. The computer-implemented method of claim 1, further comprising:
    determining that the content item has been stored in the first location of the exhaustible storage for a period of time in excess of a threshold period of time;
    identifying a second location of the exhaustible storage, wherein the second location has been accessed fewer than a threshold number of times; and
    moving the content item from the first location to the second location.

9. The computer-implemented method of claim 1, further comprising storing, in the non-exhaustible storage, error correction information for the content item.

10. The computer-implemented method of claim 1, further comprising storing metadata for the exhaustible storage in the non-exhaustible storage, wherein the metadata includes at least one of the following: an operational state for an exhaustible storage device of the exhaustible storage and a number of data operations experienced by the exhaustible storage device.

11. A computer-implemented method comprising:
    receiving a content item posted to an online system by a user of the online system for storage by a file system of the online system;
    determining an estimated access pattern for the content item based on a prediction of how frequently the online system modifies the content item posted on the online system by the user;
    selecting a first exhaustible storage device of an exhaustible storage module to store the received content item based at least in part on the estimated access pattern for the content item;
    storing the content item at the selected first exhaustible storage device of the exhaustible storage module;
    storing metadata for the content item in a non-exhaustible storage module, wherein the metadata references the first exhaustible storage device storing the content item and includes information describing online system users' interactions with the content item that was posted to the online system; and
    moving the content item from the first exhaustible storage device to a second exhaustible storage device based at least in part on a number of data operations experienced by the first exhaustible storage device and a number of data operations experienced by the second exhaustible storage device.

12. The computer-implemented method of claim 11, wherein moving the content item includes:
    estimating a future number of accesses for the content item;
    determining that the future number of accesses falls below an access threshold; and
    moving the content item from the first exhaustible storage device to the second exhaustible storage device, wherein the second exhaustible storage device has experienced a number of data operations that is a greater than a number of data operations experienced by the first exhaustible storage device.

13. The computer-implemented method of claim 12, wherein estimating the future number of accesses for the content item is based at least in part on a number of accesses performed on the content item over time.

14. The computer-implemented method of claim 11, wherein moving the content item includes:
    estimating a future number of accesses for the content item;
    determining that the future number of accesses exceeds an access threshold; and
    moving the content item from the first exhaustible storage device to the second exhaustible storage device, wherein the second exhaustible storage device has experienced a number of data operations that is less than a number of data operations experienced by the first exhaustible storage device.

15. The computer-implemented method of claim 14, wherein estimating the future number of accesses for the content item is based at least in part on one or more activities of a user associated with the content item.

16. The computer-implemented method of claim 15, further comprising:
    determining that the second exhaustible storage device has reached a threshold number of lifetime data operations;
    moving the content item from the second exhaustible storage device to a third exhaustible storage device, wherein the third exhaustible storage device has experienced a number of data operations that is less than the threshold number of lifetime data operations; and
    marking the second exhaustible storage as being unsuitable for the storage of content items.

17. The computer-implemented method of claim 11, further comprising storing erasure codes for the content item in the exhaustible storage module.

18. A computer-implemented method comprising:
    receiving a plurality of data files posted to an online system for storage by a file system of the online system;
    determining an estimated access pattern for each of the data files based on a prediction of how frequently the online system modifies one or more of the posted data files;
    storing the plurality of data files in a plurality of interconnected exhaustible storage devices based at least in part on the determined estimated access pattern;
    storing metadata supporting the storage of the plurality of data files in a non-exhaustible storage, the metadata including information describing online system users' interactions with one or more of the data files posted to the online system;
    storing error correction information for the plurality of data files in the non-exhaustible storage;
    determining a number of lifetime program-erase cycles performed on each of the plurality of interconnected exhaustible storage devices;
    moving one or more of the plurality of data files from a first set of exhaustible storage devices of the plurality of exhaustible storage devices to a second set of exhaustible storage devices of the plurality of exhaustible storage devices, wherein the moving is based at least in part on the determined number of lifetime program-erase cycles for each of the exhaustible storage devices in the first and second sets.

19. The computer-implemented method of claim 18, wherein moving the one or more data files includes:
    determining that the one or more data files have experienced fewer data operations in comparison to other data files in the plurality of data files;
    determining that the first set of exhaustible storage devices has experienced fewer program-erase cycles in comparison to the second set of exhaustible storage devices; and
    moving the one or more data files to the second set of exhaustible storage devices based at least in part on the determinations that (1) the at least some data files have experienced fewer data operations and (2) the first set of exhaustible storage devices have experienced fewer program-erase cycles in comparison to the second set.

20. The computer-implemented method of claim 18, wherein moving the one or more data files includes:
   determining that the one or more data files have experienced more data operations in comparison to other data files in the plurality of data files;
   determining that the first set of exhaustible storage devices has more program-erase cycles in comparison to the second set of exhaustible storage devices; and
   moving the one or more data files to the second set of exhaustible storage devices based at least in part on the determinations that the at least some data files have experienced more data and the first set of exhaustible storage devices has experienced more program-erase cycles.

21. The computer-implemented method of claim 18, wherein the total capacity of the exhaustible storage devices exceeds the total storage capacity of the non-exhaustible storage.

* * * * *